(12) United States Patent
Bak et al.

(10) Patent No.: US 8,972,696 B2
(45) Date of Patent: Mar. 3, 2015

(54) PAGEFILE RESERVATIONS

(75) Inventors: Yevgeniy M. Bak, Redmond, WA (US); Mehmet Iyigun, Kirkland, WA (US); Landy Wang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 13/042,128

(22) Filed: Mar. 7, 2011

(65) Prior Publication Data

US 2012/0233438 A1    Sep. 13, 2012

(51) Int. Cl.
G06F 12/10       (2006.01)
G06F 12/08       (2006.01)
G06F 12/02       (2006.01)

(52) U.S. Cl.
CPC ............ *G06F 12/08* (2013.01); *G06F 12/0223* (2013.01); *G06F 12/10* (2013.01)
USPC ...................................................... 711/206

(58) Field of Classification Search
None
See application file for complete search history.

(56) References Cited

U.S. PATENT DOCUMENTS

| | | | |
|---|---|---|---|
| 5,101,485 A | 3/1992 | Perazzoli, Jr. | |
| 5,125,086 A | 6/1992 | Perazzoli | |
| 5,247,687 A | 9/1993 | Eilert et al. | |
| 5,388,242 A | 2/1995 | Jewett | |
| 5,517,643 A | 5/1996 | Davy | |
| 5,594,881 A | 1/1997 | Fecteau | |
| 5,628,023 A | 5/1997 | Bryant et al. | |
| 5,802,599 A * | 9/1998 | Cabrera et al. | ................ 711/170 |
| 5,826,057 A | 10/1998 | Okamoto | |
| 5,966,735 A | 10/1999 | Noel et al. | |
| 6,128,713 A * | 10/2000 | Eisler et al. | ................... 711/159 |
| 6,442,664 B1 | 8/2002 | Maynard et al. | |
| 6,496,909 B1 * | 12/2002 | Schimmel | ..................... 711/163 |
| 6,496,912 B1 | 12/2002 | Fields, Jr. et al. | |
| 6,681,239 B1 | 1/2004 | Munroe | |
| 7,197,590 B2 | 3/2007 | Chiu | |
| 7,437,529 B2 | 10/2008 | Burugula | |
| 7,475,183 B2 | 1/2009 | Traut | |
| 7,610,437 B2 | 10/2009 | Sinclair et al. | |
| 7,624,240 B1 | 11/2009 | Colbert et al. | |
| 7,797,510 B1 | 9/2010 | Case | |
| 2003/0037060 A1 * | 2/2003 | Kuehnel | ................... 707/103 R |
| 2006/0161912 A1 | 7/2006 | Barrs et al. | |
| 2007/0156386 A1 | 7/2007 | Guenthner et al. | |
| 2011/0153978 A1 | 6/2011 | Chalemin et al. | |

(Continued)

OTHER PUBLICATIONS

Clark, BE et al, Seletive page Updating, IBM Techincal Disclosure Bulletin, Oct. 1, 1987.*

(Continued)

*Primary Examiner* — Duc Doan
(74) *Attorney, Agent, or Firm* — John Jardine; Kate Drakos; Micky Minhas

(57) ABSTRACT

A system and method for maintaining a pagefile of a computer system using a technique of reserving portions of the pagefile for related memory pages. Pages near one another in a virtual memory space often store related information and it is therefore beneficial to ensure that they are stored near each other in the pagefile. This increases the speed of reading data out of the pagefile because total seek time of a disk drive that stores the pagefile may decrease when adjacent pages in a virtual memory address space are read back from the disk drive. By implementing a reservation system that allows related pages to be stored adjacent to one another, the efficiency of memory management of the computer system is increased.

20 Claims, 5 Drawing Sheets

(56) References Cited

U.S. PATENT DOCUMENTS

2012/0151127 A1   6/2012  Lim
2012/0233438 A1   9/2012  Bak et al.

OTHER PUBLICATIONS

Jenner, EH et al, Address Space Suballocation in a virtual storage ENvironment, IBM Techincal Disclosure Bulletin, Nov. 1, 1973.*

Azimi et al., "PATH: Page Access Tracking to Improve Memory Management," *Proc. 6th International Symposium on Memory Management*, Oct. 21-22, 2007, Montreal, Canada, http://www.eecg.utoronto.ca/~azimi/publications/azimi-ismm07.pdf, retrieved Dec. 9, 2010.

"HP OpenVMS System Services Reference Manual," http://h71000.www7.hp.com/doc/83final/4527/4527pro_022.html, retrieved Dec. 8, 2010.

Microsoft, "Working Set", Retrieved on: Dec. 5, 2011, Available at: http://msdn.microsoft.com/en-us/library/windows/desktop/cc441804(d=printer,v=vs.85), 2 pgs.

Office action for U.S. Appl. No. 13/326,182, mailed on Aug. 16, 2013, Iyigun, et al., "Working Set Swapping Using a Sequentially Ordered Swap File", 5 pages.

PCT Search Report for PCT Application No. PCT/US2012/069602, mailed May 30, 2013 (10 pages).

* cited by examiner

PAGEFILE RESERVATIONS

BACKGROUND

Modern computer systems require a large amount of random access memory (RAM) to run software programs. Software, such as the operating system and various application programs, constantly interact with data stored in RAM. Each application/process is assigned pages of RAM to use. As computers became more sophisticated and complex, processes required more memory access than is physically available in RAM. Virtual addresses for memory overcome this problem by allowing processes to share physical RAM memory. Virtual memory is implemented in a computer system by writing data to non-volatile memory, such as a disk drive, instead of maintaining all process data in RAM.

A memory manager of the computer system ensures that data associated with virtual address is in physical RAM when needed. When data is not actively being used by a process, the data may be written to a pagefile stored in non-volatile memory, freeing up space in RAM for other active processes. If the inactive data is needed by a process, the data must be copied from non-volatile memory to RAM so that it is accessible to the process. If the amount of memory required by all the processes on the computer system is too much in comparison to the available physical RAM, system performance may suffer due to too much swapping of data back and forth between RAM and non-volatile memory slowing the system down.

SUMMARY

The inventors have recognized and appreciated that when data in the pagefile is fragmented performance of a computer system with virtual memory is slowed. Reading data from hard disk when it is needed in physical RAM can be extremely time inefficient if the pagefile is fragmented.

Described herein are techniques for improving system performance. By reducing fragmentation of the computer system's pagefile, the time required to load inactive pages of virtual memory when they become active may be reduced.

Fragmented pagefiles may be avoided by reserving portions of the pagefile for pages of virtual memory that are near one another. Virtual memory is often allocated to processes in blocks of many pages. Therefore, pages that are near one another are likely to belong to the same process and be related to each other. Thus, they are likely to be required by an associated process at the same time such that they are read from the pagefile together. Ensuring that adjacent pages in the pagefile are related increases the amount of data read from consecutive locations on the hard disk and therefore reduces the amount of seeking that the hard disk drive must perform. This results in a significant decrease in delay when data is read from the pagefile.

In some embodiments, areas of the pagefile near where one page will be written are reserved for pages that are near the page to be written. If those nearby pages are written to the pagefile, then they will be written to a location reserved for them within the pagefile. If a reservation does not exist for a page being written to the pagefile, then the page will be written to a portion of the pagefile that is unallocated and unreserved.

In some embodiments, the reservation system is not "strict," meaning that a portion of the pagefile reserved for a particular page does not require that no other page write to that portion of the pagefile. This is due to the pagefile being a finite, limited size in the non-volatile memory. There may be situations where the computer requires so much memory that the reservation system, which holds portions of the pagefile unused, will start writing other pages into the reserved portion of the pagefile.

In some embodiments, information regarding whether a particular page of a virtual memory space is reserved is stored in a portion of a page table entry. By adding this small amount of information to the page table entry, the overhead required to implement the reservation technique is insignificant.

In some embodiments, information regarding whether a particular portion of the pagefile is already occupied by a different page is stored in an allocation bitmap. Some embodiments also utilize a reservation bitmap that indicates which portions of the pagefile are already reserved. In these embodiments, the use of simple data structures such as bitmaps reduces the amount of overhead to implement the memory management techniques.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
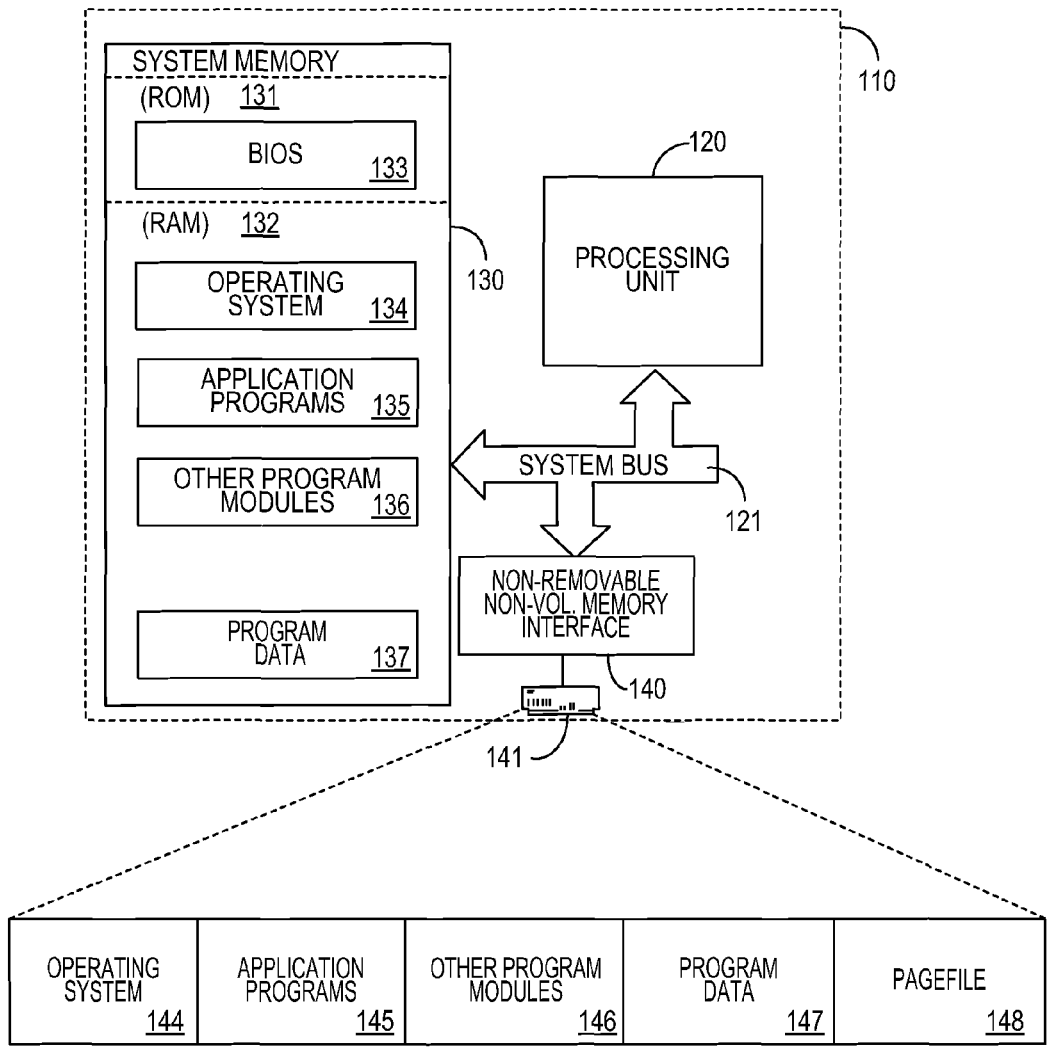
FIG. 1 is a block diagram of an exemplary environment in which embodiments of the invention may operate.

The inventors have recognized and appreciated that reducing fragmentation of a pagefile can significantly increase computer performance and user satisfaction by decreasing delays when reading data from the pagefile. The system and method presented herein prevents fragmentation from occurring in the first place rather than attempting to defragment an already fragmented memory.

The pagefile may become fragmented because the order in which data is typically written to the pagefile is determined simply by which data has been sitting dormant in RAM the longest. Fragmented data means that pieces of data that belong to the same process and/or were near each other in a virtual memory space are not near each other in the pagefile. Reading data from a fragmented pagefile is slow because most non-volatile memory is sequential access memory, such as a hard disk drive, and reading non-sequential data from the memory may be slow absent techniques such as maintaining reverse mapping information, which is costly for other reasons. For example, a spinning hard disk causes significant delays due to the "seek time" of the hard disk. Seek time is related to how long it takes a reading head of the memory to be aligned with a portion of the disk where the data to be read is stored.

Each time a small fragment of data is read, time is wasted compared to performing a single read of the same amount of data from sequential locations on the disk. As an example to illustrate the problem: the seek delay for any reading operation is approximately 10 ms. If 1-2MB of data is to be read from a fragmented pagefile, a total delay of 2-5 seconds is common These delays slow down applications running on the computer system and often the responsiveness of the computer system as a whole suffers. These problems are easily noticed by a user of the computer system and makes the user experience less enjoyable.

In some embodiments, a memory manager of a computer system implements a reservation technique to reserve portions of a pagefile. By making reservations for space in the pagefile prior to needing to write information to the pagefile, pages that are related to one another may be written together. Writing related pages together reduces the amount of time it takes to retrieve the pages stored in the pagefile because the pages may be read sequentially.

In some embodiments, when a page is written out to the pagefile, the memory manager will first check whether the page being written already has a reservation. If a reservation exists, then the page will be written to the reserved portion of the pagefile.

In some embodiments, the reservation prevents pages from being written to a reserved portion of the pagefile if they do not have a reservation. However, in cases where the computer system requires a large amount of memory to operate, the reserved portions of the pagefile can be used by pages that do not have a reservation. For example, if there is no space in the pagefile that is not already occupied or reserved by other pages, then the memory manager may "void" certain reservations and write pages to the portion of memory that was reserved for a different set of pages.

Any suitable technique may be used to track the state of the memory available for use in the pagefile. For example, various types of data structures may be used to indicate whether a page within the pagefile is reserved for a specific page of virtual memory. The same or a different type of data structure could be used to indicate whether a page of the pagefile is presently allocated and therefore storing data. In some embodiments, the data structure may be a bitmap. The memory manager may use this information to determine where to write new pages being written to the pagefile. As mentioned above, in some embodiments, when all portions of the pagefile are either allocated or reserved, the memory manager may decide to void the reservations and write on the reserved portions with pages that did not have reservations.

The memory manager that performs these operations, is typically a part of the computer system's operating system. The computer system preferably has at least a volatile memory and a non-volatile memory, but the invention is not so limited, and other embodiments are also possible. An example embodiment of a computer system that may implement the memory management technique described herein is discussed below.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, cellular phones, tablet computers, netbooks, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing a reservation system for a pagefile includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 may include a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system (OS) 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/non-volatile computer storage media that can be used in the exemplary operating environment include, but are not limited to, magnetic disks, optical disks, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. FIG. 1 also shows hard disk drive 141 storing pagefile 148, which will be discussed in more detail below.

A user may enter commands and information into the computer 110 through input devices such as a keyboard and pointing device (not shown), commonly referred to as a mouse, trackball or touch pad. Other input devices (not shown) may include a microphone, joystick, game pad, satellite dish, scanner, or the like.

Figure 2:
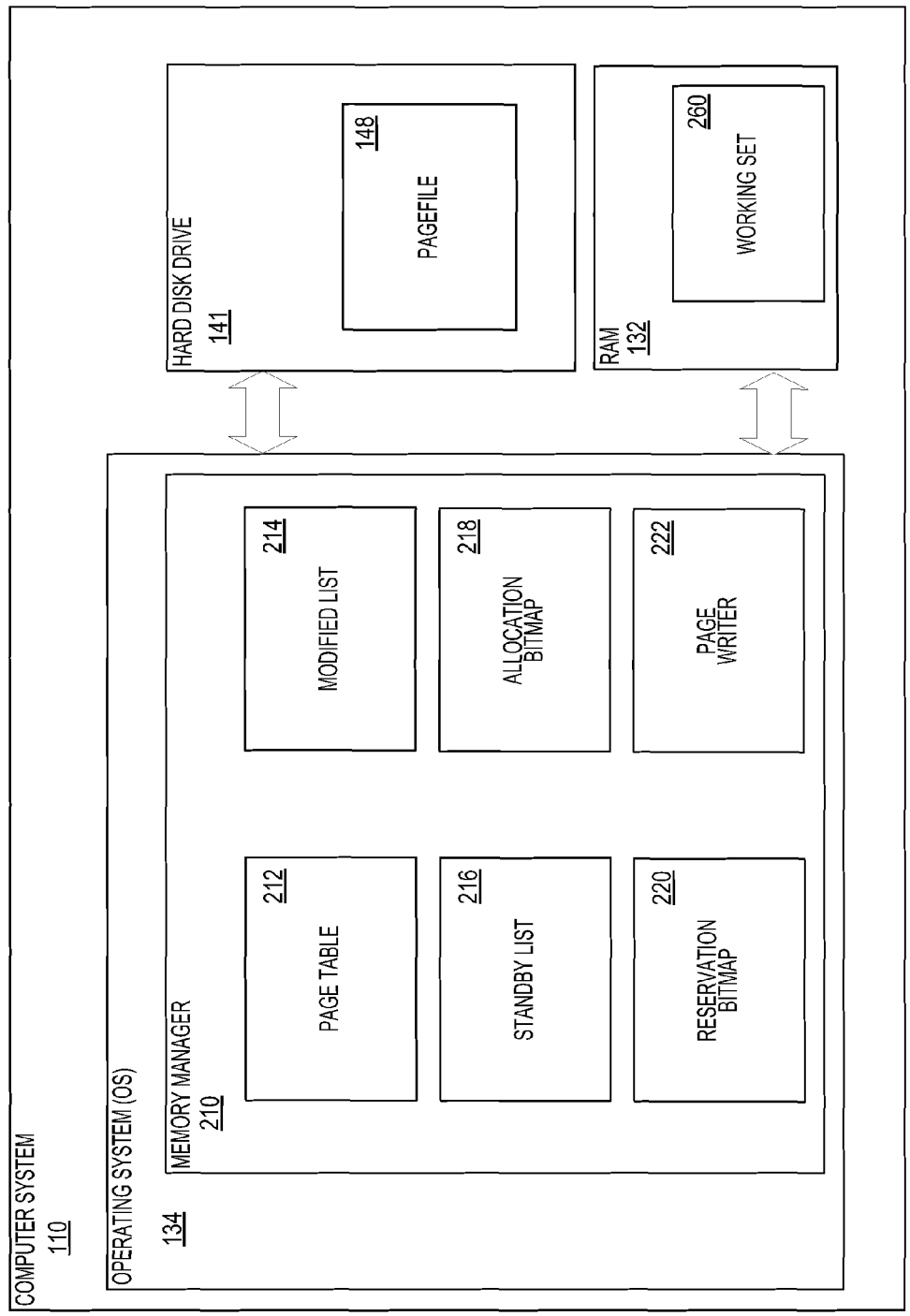
FIG. 2 is a block diagram showing several hardware and software components of a computing system of some embodiments of the present invention.

FIG. 2 illustrates example components of computer system 110 that may be used in some embodiments of a computer system that implements a pagefile with reservations. Both software and hardware components are shown and, where possible, hardware components that were shown in FIG. 1 are represented by a like numeral. Also, for clarity, FIG. 2 shows software that is stored on hardware resources, such as RAM 132, as a separate item from the hardware even though FIG. 1 shows, for example, OS 134 as being stored on RAM 132. A person of ordinary skill in the art would understand that the software is stored in memory components and that FIG. 2 is drawn to clearly elucidate the details of some embodiments.

FIG. 2 illustrates the computer system 110 comprising an OS 134, a hard disk drive 141 and RAM 132. As noted above, the invention is not limited to these specific components, but they are chosen to illustrate but one embodiment of the invention.

RAM 132, as described in view of FIG. 1, is a memory that generally holds data for processes that are presently executing on processor 120. Actively used data, stored in the portion of memory, defines a "working set" 260. It is common for RAM 132 to be divided into blocks of memory called "pages." A page is a block of memory with a specific number of bytes. A typical page is 4 KB, but pages are not so limited and may be any size. The pages contained in working set 260 may be referred to as active pages.

Hard disk drive 141 stores pagefile 148, which may be used to store pages of data and extend the memory capabilities of computer system 110. One of ordinary skill in the art would understand that hard disk drive 141 is not limited to a single pagefile 148. It is indeed contemplated that a plurality of page files may be used by memory manager 210. Only a single page file 148 is shown for clarity's sake. Furthermore, computer system 110 is not limited to a single hard disk drive 141. Computer system 110 may comprise a plurality of hard disk drives, or other memory storage devices, each with one or more page files stored thereon. An external memory device that is not part of the computer system 110 may also store a pagefile.

OS 134 comprises a memory manager 210. There are typically hundreds of other components of OS 134, but they are not illustrated for clarity's sake. Memory manager 210 typically handles interactions between OS 134 and the memory devices. The operations of memory manager 210 include the allocation of memory to processes running on processor 120. Memory manager 210 hides the details of RAM 132 and the physical pages therein from the processes that use RAM 132 by implementing a virtual memory system. Virtual memory allows software running on computer system 110 to refer to a virtualized memory address without the need to worry about the details of how to manage physical RAM 132. Memory manager 210 receives requests related to memory, identified by virtual memory address, from software applications or other software components, translates the requests into actions to implement to control the physical hardware. For example, memory manager 210 controls read and write commands to RAM 132 and controls the flow of data between software processes and RAM 132. The memory manager 210 also handles requests from multiple processes and determines how to allocate memory resources among all processes running on computer system 110.

Virtual memory is allocated to processes by memory manager 210. In some embodiments, a large block of pages is allocated at once. For example, memory may be allocated in 1 MB blocks, which is the equivalent of 256 pages of virtual memory. Because adjacent pages of a virtual memory space are associated with the same process, the pages may contain related information and therefore may be accessed by processor 120 at the same time. Even when immediately adjacent pages do not hold related information, nearby pages that are within a threshold number of pages away from one another may be accessed together, thus saving time by reducing the total number of read operations that the disk performs.

To translate between virtual memory and physical memory, memory manager 210 may maintain a map between virtual memory addresses and physical memory addresses. To map a page in virtual memory space to a page in RAM 132, memory manager 210 maintains page table 212. Details of some embodiments of page table 212 will be discussed in relation to FIG. 3A.

The memory manager 210 may allocate to processes a greater number of virtual memory pages than the number of pages that physically exist in RAM 132. To retain data for virtual memory for which there is not corresponding physical RAM, memory manager 210 maintains pagefile 148, which may be any organized collection of information stored on any suitable type of memory. Pagefile 148 may be a file maintained by the file management system of the OS of the computer system, but is not necessarily so. Any suitable portion of memory organized in a suitable way may act as a pagefile. Any suitable storage medium may be used to store the pagefile. The type of memory used to store the pagefile may be different than the type of memory used to store the active pages. In some embodiments, the pagefile may be stored on a non-volatile memory device. The memory may be a sequential access device. In some embodiments, the storage medium may be a disk or a solid state drive. In one embodiment shown in FIG. 2, the storage medium is a hard disk.

Pagefile 148 may store pages of data like those in RAM 132. However because hard disk drive 141 may be much slower at accessing the data, the pages that are stored in pagefile 148 typically hold data that is not currently needed by processor 120. Because memory manager 210 uses pagefile 148, page table 212 does not just map virtual memory addresses to physical RAM addresses, but it also maps virtual memory addresses to portions of the pagefile. Details of some embodiments of pagefile 148 will be discussed in relation to FIG. 3A.

Memory manager 210 may maintain a data structure to keep track of which portions of the pagefile are currently in use and storing data. In some embodiments this data structure is allocation bitmap 218. Each bit of allocation bitmap 218 corresponds to a page in pagefile 148. In some embodiments, a "one" represents that the corresponding page of the pagefile is in use. A "zero" represents that the corresponding page is not in use and may be allocated to a page by memory manager 210.

A page of virtual memory can be in a variety of states. One such state is "active," which, as discussed above, means that it is stored in RAM 132 and is part of working set 260. Active pages are immediately accessible to processor 120 with almost no delay. Another state is "inactive," which means that the page may be stored in the pagefile and may not be stored in RAM 132. There may be a variety of other states, including some that are in between active and inactive. For example, a page that is in a "standby" state is stored both in RAM 132 and in pagefile 148.

In some embodiments, as pages in working set 260 go unused, memory manager 210 may determine that the page may be written to pagefile 148. Any suitable policy may be used to determine which pages are written to the pagefile and when, including memory management policies as are known in the art. As an example of such a policy, unused pages may be written to the pagefile at any transition between states. In some embodiments, the first step in the process of writing a page to pagefile 148 may be "trimming" the page. Trimming refers to the act of adding a page to modified list 214. In some embodiments, the page may also be written to pagefile 148 using page writer 222 at the time of trimming. Once a page is written to the pagefile, a page is moved from modified list 214 to standby list 216. Standby list 216 keeps track of the pages that are still in RAM 132, but are also stored on hard disk 141 in pagefile 148. If memory manager 210 needs access to the data on the standby list 216, the data can be read immediately from RAM 132 because the data is still retained there. On the other hand, if memory manager 210 requires more pages of RAM 132 for some other processes, it may allocate pages of RAM that are on the standby list without losing the data in those pages because that data is also cached in pagefile 148.

In some embodiments, pages that have been written to pagefile 148 may be changed in RAM 132. These pages are referred to as "dirty" and get added back to modified list 214. Page writer 222 writes dirty pages to the pagefile again before the corresponding page in RAM 132 is allocated for a different purpose. Therefore, pages on the modified list take longer to reallocate than pages on the standby list.

In some embodiments, pages on the modified list 214 are not written to the pagefile right away because it may save time to write a larger group of pages to the pagefile in one long sequential write. For example, memory manager 210 may wait until there is 1 MB of modified data to write before initiating a write command.

Similarly, in some embodiments, it is preferred that trimmed pages not be written to pagefile 148 immediately. It may be advantageous to wait until there are several pages that need to be written to the pagefile so that page writer 222 can perform fewer write commands and thus save valuable time. It may also be advantageous to wait to write pages until the hard disk 141 is not in use by some other memory manager operations.

Once the memory manager 210 has determined a page that may be written to the pagefile 148, the memory manager 210 may check to see whether there are other pages that could also be written to pagefile 148. In some embodiments, when a page is trimmed from working set 260, memory manager 210 will check whether any neighboring pages in virtual memory are also eligible for trimming If so, memory manager 210 may trim a plurality of nearby, related pages at once. Again, the time that page writer 222 takes to write the data to pagefile 148 decreases because the data may be written to adjacent pages of hard disk 141. It may also reduce the amount of time required to read the pages out of pagefile 148 at a later time. In some embodiments, if memory manager 210 finds some other pages nearby that may be trimmed, but there are pages in between that are not being trimmed, page writer 222 may still implement a sequential writing of these separated pages. Page writer 222 does this by using "dummy" data when writing to the portions of page file 250 that correspond to pages that could not be trimmed. Using dummy data allows page writer 222 to perform sequential writing, rather than writing to multiple locations on the disk. This speeds up the writing of data because, as discussed above, seek time associated with reading or writing non-sequential locations on hard disk drive 141 may slow memory operation.

When the memory manager decides to write a page to pagefile 148, space in the pagefile may be reserved for pages of memory related to the page to be written to pagefile 148. The related pages may be other pages that are likely to be accessed at the same time as the page to be written. The reserved space may be such that the page to be written, and the related pages written in the reserved spaces, may be accessed efficiently.

For example, in some embodiments, when memory manager 210 checks for neighboring pages to trim, related pages may not be ready to be trimmed and written to the pagefile 148. The neighboring pages to the page being trimmed may be allocated, but may not even have data stored in them yet. Or the neighboring pages could hold data that was recently accessed by the processor and therefore not ready to be trimmed To ensure a less fragmented pagefile 148, memory manager 210 may reserve a portion of pagefile 148 for these neighboring pages to help cluster pages that are related to one another, such that, when the related pages are written to the pagefile, they are close together in the pagefile. Portions of the pagefile may be reserved for pages that are not ready to be trimmed. The word "close" does not require that the pages be consecutive or in a particular order, but that the pages are likely to be read together. In some embodiments, "close" or "adjacent" may mean within some threshold number of pages of each other. In an embodiment in which the pagefile is stored in a sequential memory, the reserved space may be adjacent to, either before or after, the location in which the page is written such that the pages and related data written in the reserved space, if accessed at the same time, can be accessed in sequential operations. When these pages need to be read back out of the pagefile 148, the clustering of related pages will reduce the time it takes hard disk drive 141 to read the data out of the pagefile and, therefore, reduce the time it takes to load the pages back into working set 260 in RAM 132.

One of ordinary skill in the art would understand that all pages need not have reservations. It should be understood that due to finite memory size, the more reservations that are made, the less the reservation helps maintain a defragmented pagefile. For some types of pages, a reservation may prove extremely useful. For others, it may not be helpful in achieving the goal of a defragmented pagefile. For example, processes that allocate pages in smaller numbers or processes that utilize the pages randomly and not consecutively may not benefit from a reservation. Also, background processes or application that are considered unimportant may not be given reservations. It is contemplated that memory manager 210 may apply any number of criteria to determine whether a page should get a reservation. For example, memory manager 210 may use a priority ranking for processes to determine which pages are given reservations. It is also contemplated that memory manager 210 may learn which processes do not benefit from reservations and stop making reservations for those processes. For example, the priority of processes that have been found not to benefit from reservations may be reduced my memory manager 210, resulting in reservations not being made for those processes in the future.

A reservation is not limited to being made a specific time. In some embodiments a reservation for a page and its neighboring pages may be made when the page is trimmed and before the page is written to pagefile 148. In other embodiments, a reservation may be made at other times, such as when the page is written to pagefile 148 or even when related pages are allocated.

It is also contemplated that, in some embodiments, related pages may not be adjacent or even near one another in virtual memory. There may be other criteria used by memory manager 210 to determine whether pages are related to one another and therefore should be written near one another in pagefile 148. For example, in some embodiments, when memory manager 210 is writing a page to pagefile 148 and the page belongs to a particular process, memory manager 210 may make reservations for other pages belonging to the same process, even if they are not close in the virtual memory space to the page being written.

Reservations may be tracked using a data structure. The details of the data structure may vary and one of skill in the art would recognize that there are a variety of ways to implement a data structure to hold reservation information. In one embodiment, the reservation data structure is incorporated into page table 212, reducing the amount of overhead to implement the system. Details of the page table will now be discussed with reference to FIG. 3A.

Figure 3:
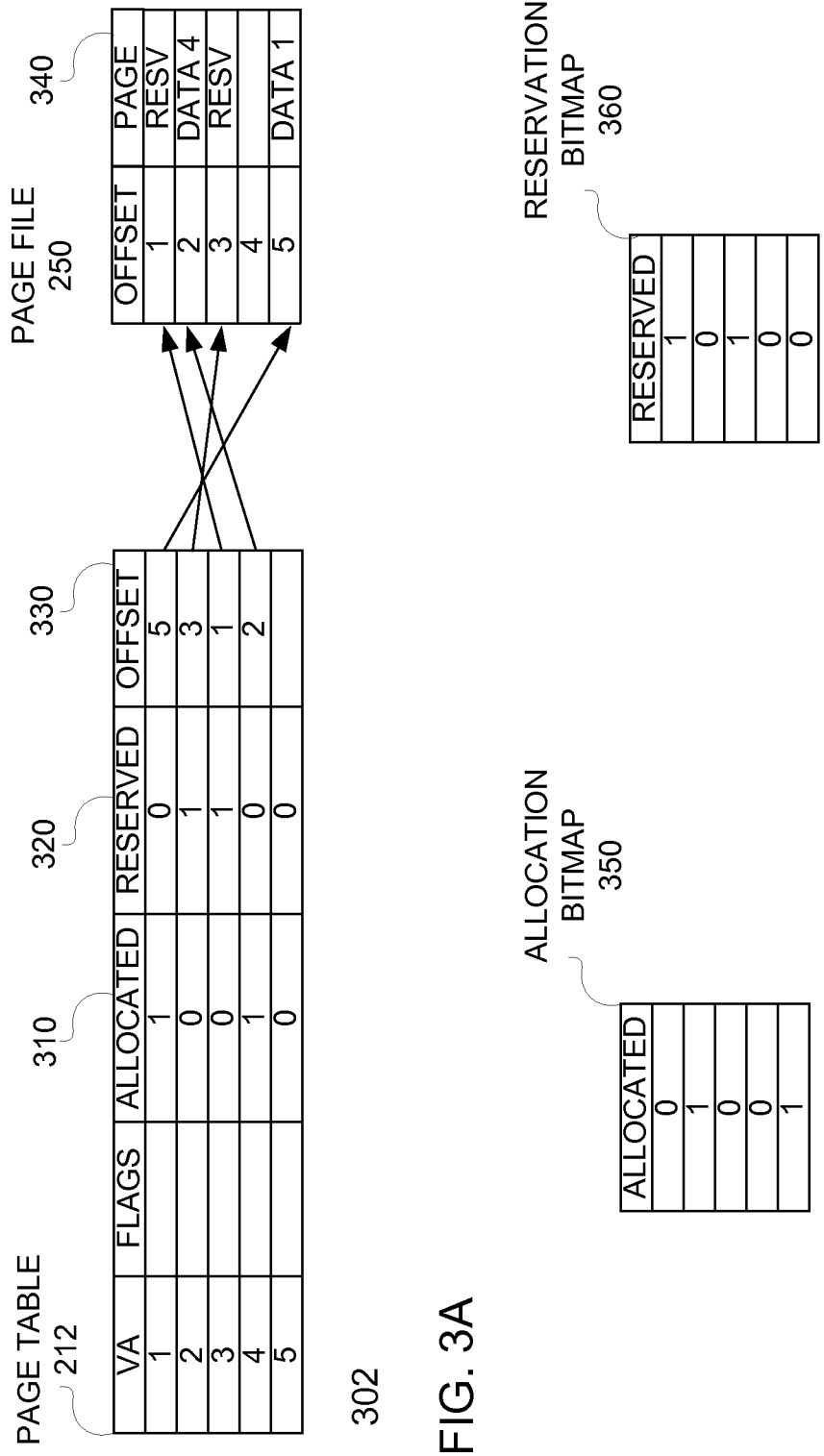
FIG. 3A is a simplified diagram of a page table, a pagefile and their relation.
FIG. 3B is an example allocation bitmap.
FIG. 3C is an example reservation bitmap.

FIG. 3A shows a simplified version of a page table 212. One of skill in the art would recognize that there are many ways to implement a page table. In one embodiment, the page table may be implemented using linked lists. However, the specific implementation of the page table is not critical to the invention. For clarity, entries corresponding to only five virtual memory pages are shown in FIG. 3A, but one skilled in the art would recognize that the a data structure may be extended to thousands or millions of pages.

The portion of page table 212 illustrated in FIG. 3A focuses on how page table 212 maps virtual memory addresses 1-5 to locations in pagefile 250. Here, the locations are represented as offsets 330 in a pagefile 250. Each row of page table 212 is a page table entry. Similar page table entries exist to map virtual memory addresses to physical memory address in RAM 132. In some embodiments, whether the column labeled offset 330 maps the virtual address to a pagefile or a page in RAM 132 is determined by a flag (not shown). There are a variety of other flags that may be used by the page file.

Column 320 of page table 212 stores values representing whether the corresponding virtual address has a reservation in the pagefile or not. In some embodiments, an entry of "one" in column 320 is interpreted by memory manager 210 to mean that a portion of the pagefile is reserved for that page. An entry of "zero" indicates that there is no reservation. One of ordinary skill in the art would understand that there may be other ways to implement this reservation information and that a column in the page table is but one example embodiment.

Column 310 of page table 212 determines whether data for a page at the corresponding virtual address is stored in the pagefile or not. In some embodiments, an entry of "one" in column 320 is interpreted by memory manager 210 to mean that a portion of the pagefile contains the data for that page. An entry of "zero" indicates that a portion of the pagefile has not been allocated for that page. One of ordinary skill in the art would understand that there may be other ways to implement this allocation information and that a column in the page table is but one example embodiment.

In some embodiments, values in columns 310 and 320, which indicate allocation and reservation information, respectively, may be considered flags in the page table entry.

Column 330 of page table 212 gives the offset in pagefile 250 that corresponds to the virtual address of that page table entry. For example, virtual address 1 of page table 212 indicates that the data for that page is stored five pages into pagefile 250. It is column 310 that indicates that virtual address 1 is allocated in the pagefile, meaning data is stored in that portion of pagefile 250. Whereas the page table entry for virtual address 2 indicates that there is no data, but there is a portion of the page table reserved for the data from page 2 of the virtual memory. Column 330 determines that the reserved portion of pagefile 250 is three pages in.

FIG. 3A also shows a simplified version of a pagefile. One of skill in the art would understand that this is a simplification for the sake of clarity and that there are other embodiments of pagefiles that are contemplated by this invention.

Because, in the embodiments described, memory allocation is done in increments of pages, the offset within pagefile 250 is measured in pages. The first column indicates the offset value, though one of skill in the art would understand that in some embodiments that column is not actually present and that it is shown in FIG. 3A to provide clarity.

As discussed above, the data for the first page of virtual memory is located five pages into pagefile 250. Looking at column 340 of pagefile 250, the fifth page into pagefile 250 holds "DATA 1" which represents the data for the first virtual address page. The third page of pagefile 250 shows "RESV" in column 340, which represents that this page of the pagefile is reserved.

FIG. 3B illustrates allocation bitmap 350, which corresponds to pagefile 250. Allocation bitmap 350 is an example embodiment of a data structure that holds allocation information corresponding to pagefile 250. One of skill in the art would understand that there are a wide variety of other data structures that could hold similar information.

Corresponding rows of allocation bitmap 350 in FIG. 3B and pagefile 250 in FIG. 3A show that when pagefile 250 stores data, the entry in allocation bitmap 350 is "one." Memory manager 210 may use allocation bitmap 350 as a quick, efficient way to check which portions of pagefile 250 are free and which are occupied with data.

FIG. 3C illustrates reservation bitmap 360, which corresponds to pagefile 250. Reservation bitmap 360 is an example embodiment of a data structure that holds reservation information corresponding to pagefile 250. One of skill in the art would understand that there are a wide variety of other data structures that could hold similar information.

Corresponding rows of reservation bitmap 360 in FIG. 3C and pagefile 250 in FIG. 3A show that when a page in pagefile 250 is reserved, a corresponding entry in reservation bitmap 360 is "one." Memory manager 210 may use reservation bitmap 360 as a quick, efficient way to check which portions of pagefile 250 are free and which are reserved.

Figure 4:
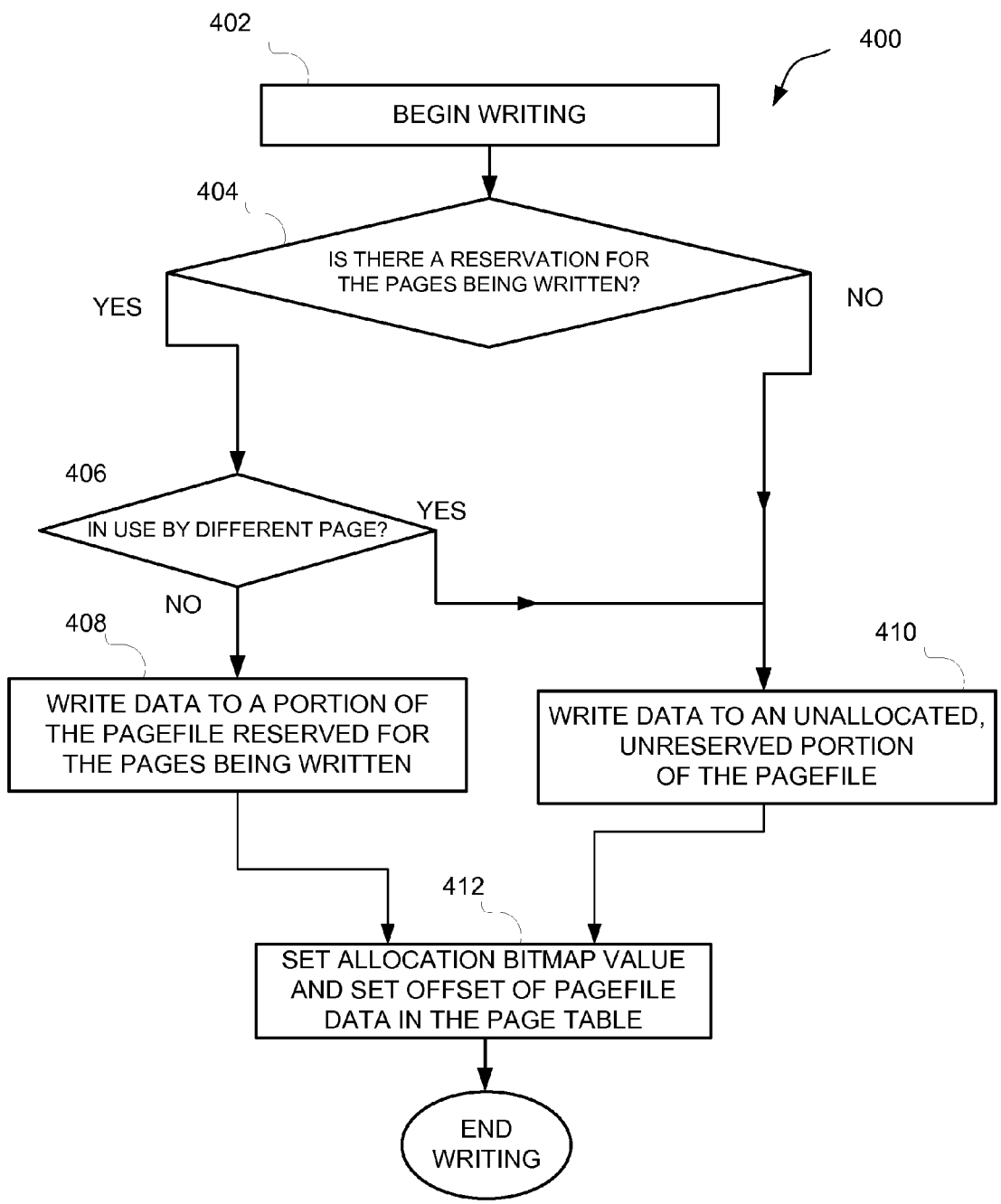
FIG. 4 is a flow chart of an exemplary process of writing a page to the pagefile.

Further embodiments of the invention may be a method for writing pages to the pagefile using reservations. Some embodiments of the method may be implemented by components of a computer system 110 shown in FIG. 1 and FIG. 2. Embodiments may also use data structures such as those described in conjunction with FIG. 3A-C. An example embodiment of the method will be discussed in connection with FIG. 4. The method 400 for writing pages to pagefile 250 begins when memory manager 210 decides to use page writer 222 to write a page at step 402. Memory manager 210 checks whether a reservation for the page being written exists at step 404. In some embodiments, this is achieved by locating the page table entry for the page being written and checking the entry in column 320 of page table 212. If the entry indicates that there is a reservation, memory manager 210 uses the offset value from the entry in column 330 as the location in the pagefile to write to.

The reservation system may not strictly adhere to the reservation indicators described above. As discussed above, there may be times of high memory usage when memory manager 210 will decide to ignore reservations and write pages to the pagefile at locations that are already reserved. In some embodiments, memory manager 210 checks allocation bitmap 350 to determine if some other page has already written data to the reserved page in pagefile 250 (step 406). If allocation bitmap 350 indicates that the page in pagefile 250 is in use, then memory manager 210 will decide to write the data from the page to a different portion of pagefile 250. In some embodiments, the memory manager will choose to write the data to a page in pagefile 250 that is both unallocated and unreserved (step 410). In some embodiments, whether a portion of pagefile 250 is unallocated and unreserved is determined using allocation bitmap 350 and reservation bitmap 360. If memory manager 210 can not locate a portion of pagefile 250 that is both unallocated and unreserved, then the data will be written to a page that is unallocated but has a reservation. By writing over a reservation, the memory manager 210 voids the reservation for a different page. When a reservation is voided, memory manager 210 changes the corresponding entry in reservation bitmap 360 so that it no longer indicates that portion of the pagefile is reserved. Furthermore, whenever page writer 222 writes any data to a page in pagefile 250, memory manager 210 will change the corresponding entry in the allocation bitmap to indicate that portion of the pagefile is in use (step 412). Memory manager 210 will also set the entry in the offset column 330 of page table 212 to the appropriate offset value, as well as the allocation flag in column 310 to indicate the pages data is cached in pagefile 250.

Returning to step 406, if the reserved page of pagefile 250 is not in use by a different page, then page writer 222 writes data from the page to the portion of pagefile 250 indicated by the entry in offset column 330 (step 408). Again, whenever page writer 222 writes any data to a page in pagefile 250, memory manager 210 will change the corresponding entry in the allocation bitmap to indicate that that portion of the pagefile is in use (step 412). Memory manager 210 will also set the entry in the offset column 330 of page table 212 to the appropriate offset value and set the allocation flag in column 310.

Returning to step 404, if there is no reservation for the page being written, then method 400 continues to step 410 where the data is written to an unallocated, unreserved portion of the pagefile. As before, in some embodiments, the allocation and reservation status of a portion of pagefile 250 may be determined using allocation bitmap 350 and reservation bitmap 360.

Figure 5:
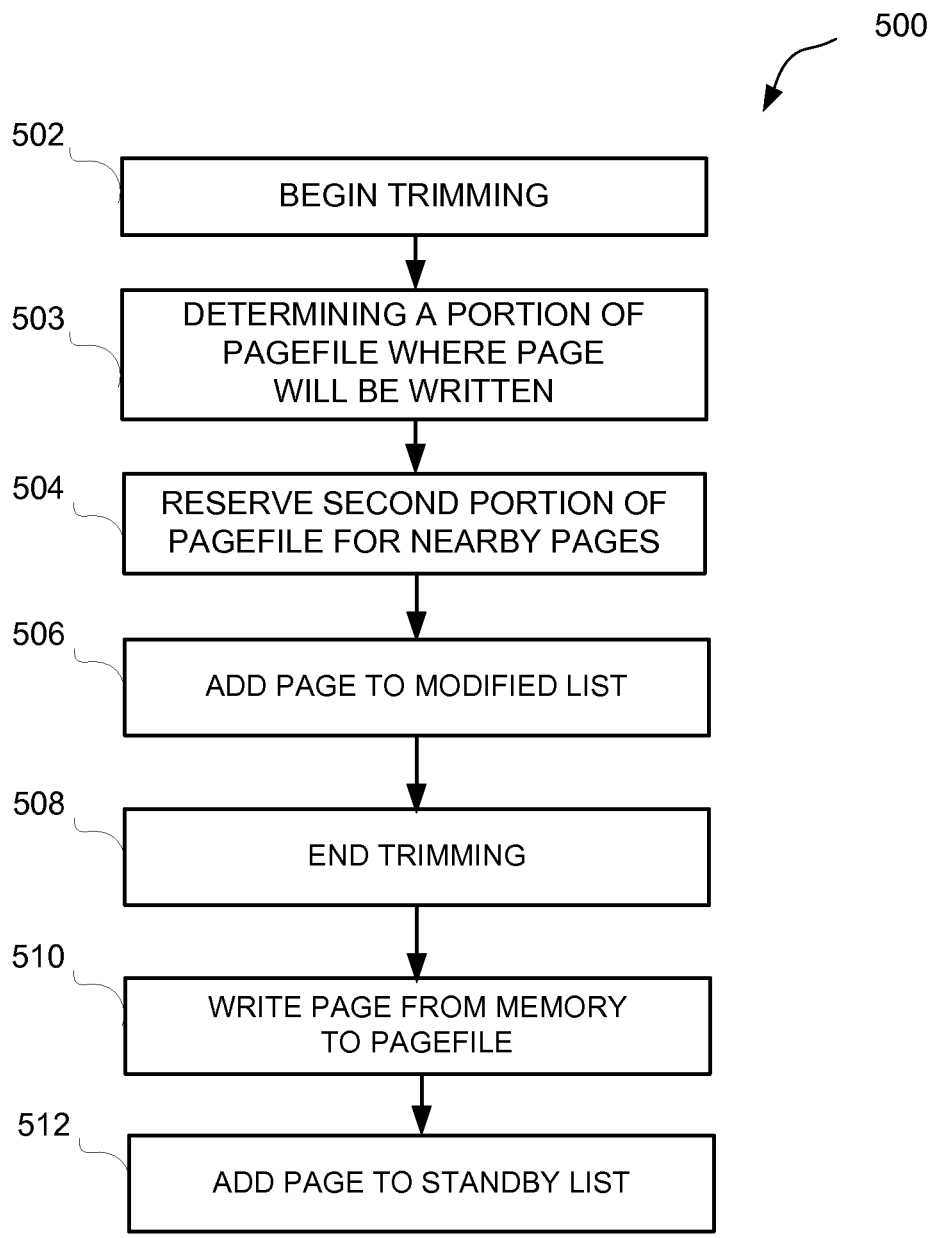
FIG. 5 is a flow chart of an exemplary process associated with trimming a page from the working set.

A further embodiment of the present invention is a method for trimming a page from working set 260, which is illustrated, for example, by method 500 in FIG. 5. Memory manager 210 may operate according to various policies when making decisions about how and when to write pages to a pagefile and when to make reservations for related pages. In some embodiments, method 500 begins at step 502, where memory manager 210 decides to trim a page. This decision may be made for a variety of reasons, including how long it has been since the page was used or modified. One skilled in the art would realize that this is not the only reason to trim a page and the invention is not so limited.

At step 503, the location within the pagefile where the trimmed page will be written is determined. At step 504, reservations are made for pages in virtual memory adjacent to the page being trimmed. These reservations will be used in a later writing operation 400 to keep related pages of virtual memory close to each other in pagefile 250. At step 506, the page being trimmed is added to modified list 214. Once the page is added to the modified list 214, the official trimming of the page ends 508. At step 510, which may occur at any time after trimming is complete, data from the page is written to the pagefile 250. At step 512, the page may be removed from modified list 214 and added to standby list 512. Being on the standby list reflects that the data associated with the page is both in RAM 132 and in pagefile 250. At some later time (not shown), the page may become "dirty" due to the processor changing the data associated with the page. When this occurs, the page may be taken off the standby list 216 and added back to modified list 214.

The steps of trimming method 500 are not limited to the particular order shown in FIG. 5. For example, in one embodiment, the writing of the page to the pagefile (step 510) may be postponed until other pages are found to write to pagefile 250 at the same time so that time is saved by writing the data sequentially. In another embodiment, the reservation of portions of the pagefile for nearby pages (step 504) may occur after the page is added to the modified list or written to pagefile 250.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

One of ordinary skill in the art would recognize that many concepts disclosed herein have been simplified to provide clarity and that the invention is not limited to these simplified embodiments.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device having a first type of memory and a second type of memory, the first type of memory storing a working set of active memory pages, the method comprising:

determining a first portion of a pagefile in the second type of memory where first data of a first page of said working set is to be written; and reserving at least a second portion of the pagefile adjacent to the first portion of the pagefile for one or more pages of a virtual memory space that are within a threshold number of pages away from a first page in the virtual memory space, wherein the first page in the virtual memory space maps to the first page of said working set and maps to the first portion of the pagefile.

2. The method of claim 1, further comprising:
writing the first data of the first page to the first portion of the pagefile;
determining to write second data of a second page to the pagefile;
checking whether a reservation exists for the second page, the reservation reserving the second portion of the pagefile for the second data of the second page; and
if the reservation exists for the second page, writing the second data of the second page to the second portion of the pagefile.

3. The method of claim 2, further comprising:
if the reservation does not exist for the second page, writing the second data of the second page to a portion of the pagefile that is both unallocated and unreserved.

4. The method of claim 2, further comprising:
checking whether the second portion of the pagefile is already in use before writing the second data of the second page.

5. The method of claim 4, further comprising:
if the second portion of the pagefile is already in use, identifying a portion of the pagefile that is both unallocated and unreserved; and
writing the second data of the second page to the identified portion of the pagefile that is both unallocated and unreserved.

6. The method of claim 4, wherein checking whether the second portion of the pagefile is already in use comprises accessing allocation information in an allocation data structure.

7. The method of claim 6, where the allocation data structure is a bitmap.

8. The method of claim 1, wherein reserving at least the second portion of the pagefile comprises entering reservation information into a data structure.

9. The method of claim 8, wherein the data structure is a page table entry.

10. The method of claim 1, further comprising:
setting a value in an allocation bitmap corresponding to the first page; and
setting a location of the first portion of the pagefile in a page table entry corresponding to the first page.

11. A computer system adapted to reserve portions of a pagefile, the computer system comprising:
a volatile memory that stores a plurality of pages;
a non-volatile memory that stores the pagefile;
a memory manager that decides to write a first page of said plurality of pages to the pagefile, the memory manager comprising:
a page table entry comprising reservation information, wherein the memory manager determines whether the first portion of the pagefile is reserved for the first page based on the reservation information; and
a page writer that:
writes a first page of the volatile memory to the first portion of the pagefile in response to determining that the first portion of the pagefile is reserved for the first page of the volatile memory; and
reserves at least a second portion of the pagefile adjacent to the first portion of the pagefile for one or more pages that are within a predetermined number of pages away from a page in a virtual memory space, wherein the page in the virtual memory space maps to the first page of the volatile memory and maps to the first portion of the pagefile.

12. The computer system of claim 11, wherein the memory manager further comprises an allocation data structure that determines if the first portion of the pagefile is allocated to a different page.

13. The computer system of claim 12, wherein:
the page writer writes the first page to a portion of the pagefile that is both unallocated and unreserved, as determined by consulting a reservation data structure and the allocation data structure, in response to determining that the first portion of the pagefile is not reserved for the first page.

14. The computer system of claim 12, wherein:
the page writer writes the first page to a portion of the pagefile that is both unallocated and unreserved, as determined by consulting a reservation data structure and the allocation data structure, in response to determining, by the memory manager, that the first portion of the pagefile is allocated to a different page.

15. The computer system of claim 12, wherein the allocation data structure comprises an allocation bitmap.

16. The computer system of claim 11, wherein the page writer writes the one or more pages that are within the predetermined number of pages away from the page in the virtual memory space to the second portion of the pagefile adjacent to the first portion of the pagefile in response to the reserving at least the second portion of the pagefile.

17. At least one computer readable storage device having computer-executable instructions stored thereon which, when executed by a computer comprising a processor, a first type of memory and a second type of memory, the first type of memory storing a working set of active memory pages, cause the computer to perform a method comprising:
determining a first portion of the pagefile in the second type of memory where first data of a first page of said working set will be written;
reserving at least a second portion of the pagefile adjacent to the first portion of the pagefile for one or more pages that are within a threshold number of pages away from a first page in a virtual memory space, wherein the first page in the virtual memory space maps to the first page of said working set and maps to the first portion of the pagefile;
writing the first data of the first page of said working set to the first portion of the pagefile in the second type of memory;
determining to write second data of a second page of said working set to the pagefile;
checking whether a reservation exists for the second page of said working set, the reservation reserving the second portion of the pagefile for the second data of the second page of said working set;
checking whether the second portion of the pagefile is allocated to a different page than the second page of said working set; and
if the reservation exists for the second page of said working set and the second portion of the pagefile is not allocated to the different page, writing the second data of the second page of said working set to the second portion of the pagefile.

18. The at least one computer readable storage device of claim 17, wherein the method further comprises:
if the reservation does not exist for the second page, writing the second data of the second page to a portion of the pagefile that is both unallocated and unreserved.

19. The at least one computer readable storage device of claim 17, wherein the method further comprises:
if the reservation exists for the second page and the second page is allocated to the different page, writing the second data of the second page to a portion of the pagefile that is both unallocated and unreserved.

20. The at least one computer readable storage device of claim 17, wherein reserving at least the second portion of the pagefile comprises entering reservation information into a reservation data structure.

* * * * *